(12) United States Patent
Nagai et al.

(10) Patent No.: US 6,880,417 B2
(45) Date of Patent: Apr. 19, 2005

(54) ELECTRIC ACTUATOR

(75) Inventors: Shigekazu Nagai, Adachi-ku (JP);
Masaki Miyahara, Moriya (JP);
Yoshiyuki Yamasaki, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/186,751

(22) Filed: Jul. 2, 2002

(65) Prior Publication Data

US 2003/0000322 A1 Jan. 2, 2003

(30) Foreign Application Priority Data

Jul. 2, 2001 (JP) ........................................ 2001-201425

(51) Int. Cl.[7] ............................................. F16H 25/20
(52) U.S. Cl. ..................... 74/89.36; 74/89.33
(58) Field of Search ........................... 74/89.33, 89.36, 74/89.23

(56) References Cited

U.S. PATENT DOCUMENTS

| | | | | |
|---|---|---|---|---|
| 2,015,430 A | * | 9/1935 | Matthews et al. | 403/359.6 |
| 2,315,571 A | * | 4/1943 | Wilder | 74/89.33 |
| 4,137,784 A | * | 2/1979 | Griffin | 74/89.37 |
| 4,614,128 A | * | 9/1986 | Fickler | 74/89.31 |
| 4,936,692 A | * | 6/1990 | Tanaka | 384/43 |
| 5,809,831 A | * | 9/1998 | Nagai et al. | 74/89.4 |

* cited by examiner

Primary Examiner—William C. Joyce
(74) Attorney, Agent, or Firm—Paul A. Guss

(57) ABSTRACT

The rotary motion of a ball screw shaft is converted into the rectilinear motion by a ball spline nut provided integrally with displacement members by the aid of an attachment section. Involute splines are engraved on outer circumferential surfaces of spline pistons connected to the displacement members. The spline pistons are slidably meshed with a splined bore of the involute splines formed on an inner wall surface of a frame. The attachment section is displaceable in a longitudinal direction of the frame by the aid of the splined bore and the spline pistons.

13 Claims, 12 Drawing Sheets

ELECTRIC ACTUATOR

BACKGROUND OF THE INVENTION

1. Field of the Invention

The present invention relates to an electric actuator. In particular, the present invention relates to an electric actuator in which a displacement member makes rectilinear motion under a guiding action of a spline guide mechanism using an involute spline.

2. Description of the Related Art

Electric actuators, which use a feed screw mechanism, have been hitherto used as a means for transporting a workpiece or the like. The electric actuator comprises a feed screw shaft which is coaxially connected, via a coupling member, to a drive shaft of a motor in a frame. A feed nut, which is provided for a displacement member, is screw-engaged with the feed screw shaft. A linear guide mechanism including, for example, a guide rail and a guide block which slides along the guide rail is provided in the frame. The displacement member is linearly guided along the feed screw shaft. An attachment section, which protrudes to the outside through a slit formed through the frame, is provided on one side of the displacement member. The attachment section is connected to a slide table.

In this arrangement, the feed screw shaft is rotated by the rotation of a motor. The rotary motion of the feed screw shaft is converted by the feed nut into the rectilinear motion. The displacement member is displaced in the longitudinal direction of the frame under the guiding action of the linear guide mechanism. Accordingly, the slide table is displaced, and thus the workpiece on the slide table is transported.

However, in the conventional electric actuator, when a heavy workpiece is placed on the slide table to transport the workpiece, the linear guide mechanism cannot absorb the load applied by the action of the gravity exerted on the workpiece in a circumferential direction about the center of the axis of the feed screw shaft, in a circumferential direction about the center of the horizontal line substantially perpendicular to the axis of the feed screw shaft, in a circumferential direction about the center of the vertical line substantially perpendicular to the axis of the feed screw shaft, and in a direction obtained by compositively combining the these directions.

As a result, the feed screw shaft is flexibly bent, and the sliding resistance is increased between the feed screw shaft and the feed nut.

SUMMARY OF THE INVENTION

A general object of the present invention is to provide an electric actuator which appropriately absorbs the load applied to a displacement member in a variety of directions for preventing the load from being transmitted to a feed screw shaft.

A principal object of the present invention is to provide an electric actuator which absorbs the load applied to a displacement member in a substantially vertical direction, in a circumferential direction about a center of an axis of a feed screw shaft, in a circumferential direction about a center of a horizontal line substantially perpendicular to the axis of the feed screw shaft, in a circumferential direction about a center of a vertical line substantially perpendicular to the axis of the feed screw shaft, and in a direction obtained by compositively combining these directions for preventing the load from being transmitted to the feed screw shaft.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
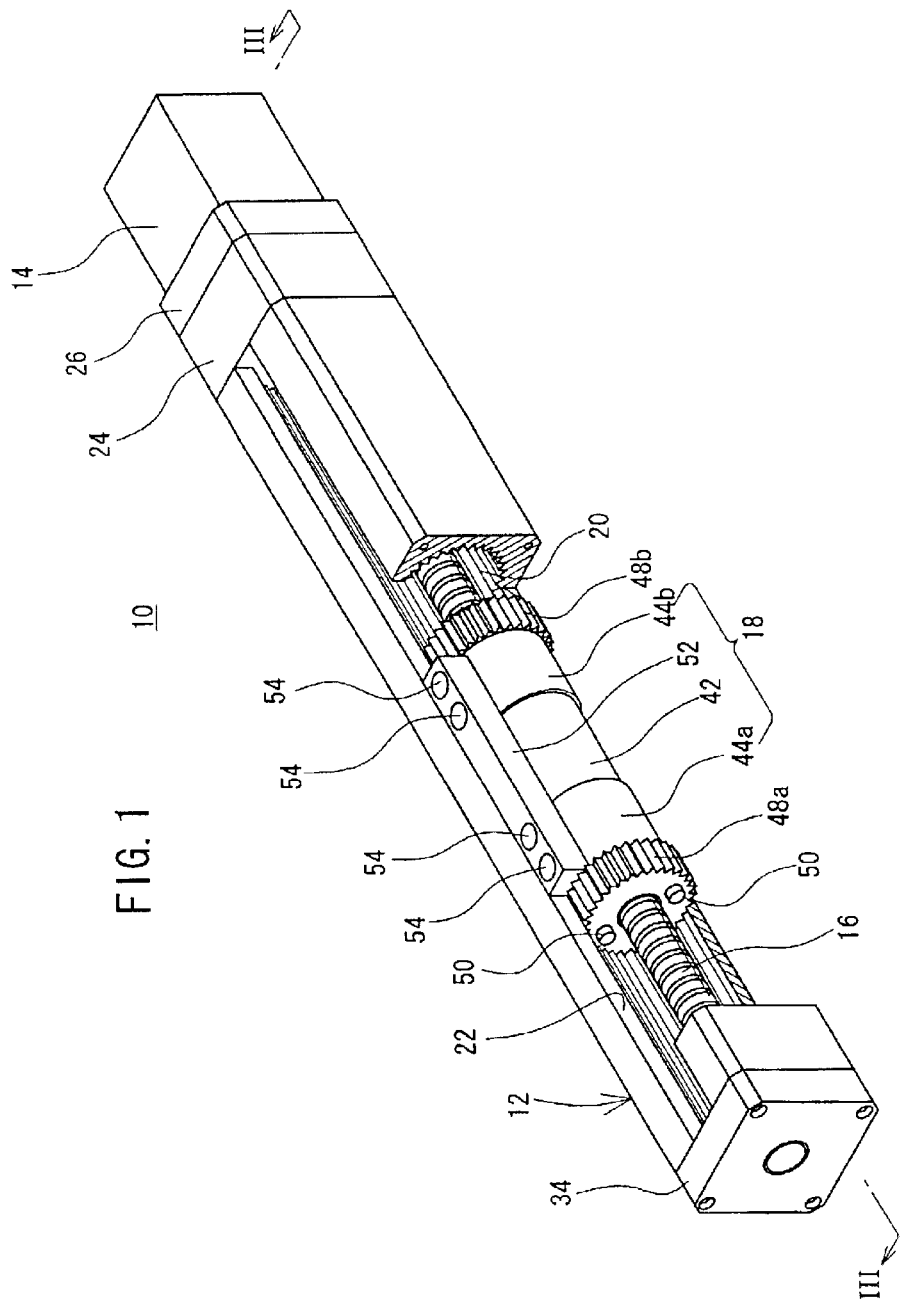
FIG. 1 is a perspective view partially in cross section showing an electric actuator according to an embodiment of the present invention.
Figure 2:
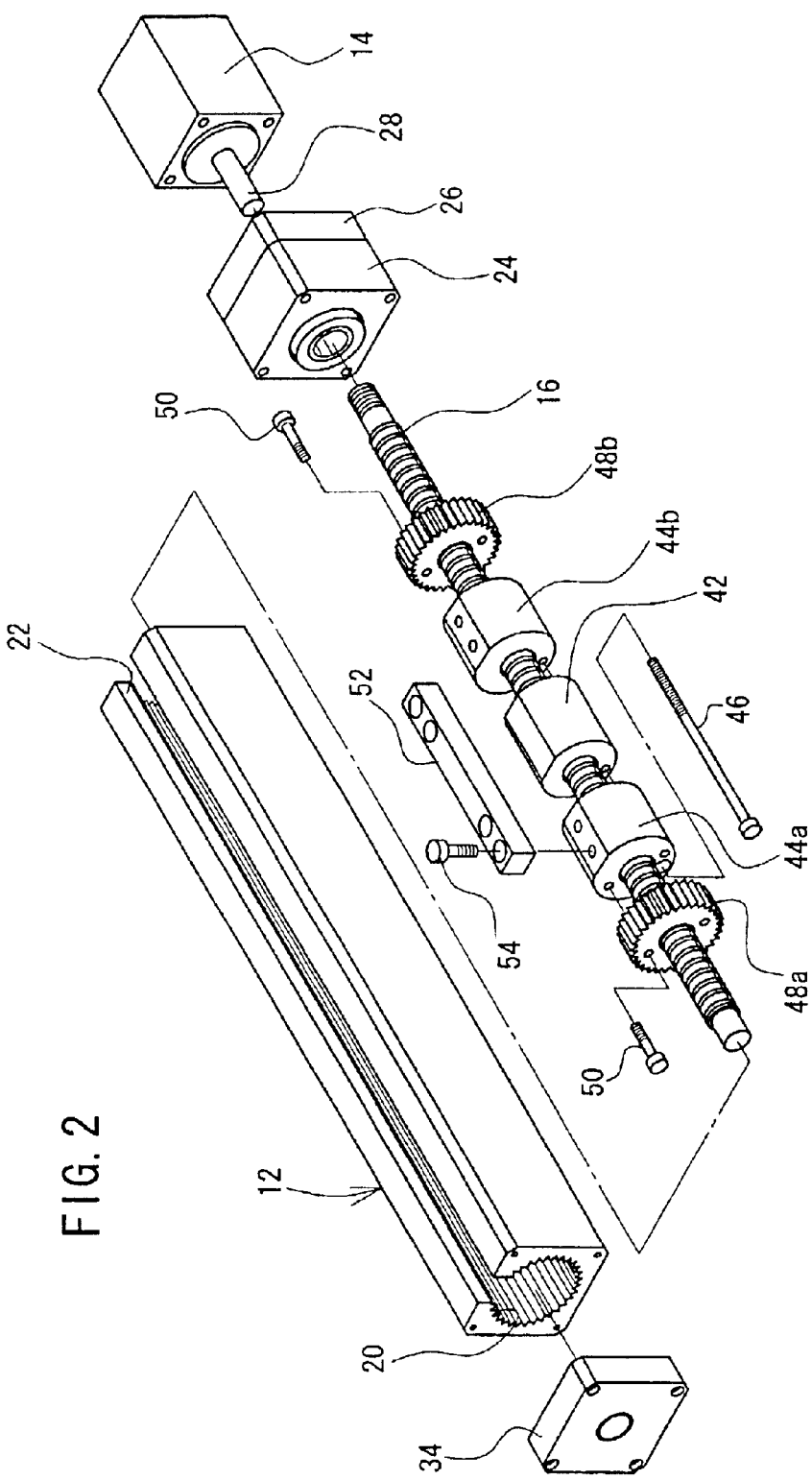
FIG. 2 is a schematic exploded perspective view showing the electric actuator shown in FIG. 1.

With reference to FIGS. 1 to 5, reference numeral 10 indicates an electric actuator according to an embodiment of the present invention. The electric actuator 10 basically comprises an elongated frame 12, a motor (rotary driving source) 14 which is provided at one end of the frame 12, a ball screw shaft 16 as a feed screw shaft which is rotatably supported in the frame 12, and a displacement mechanism 18 which is displaceable by the aid of the ball screw shaft 16.

The frame 12 is provided with a splined bore (spline guide mechanism) 20 which has involute splines (splines each having a spline tooth with an involute curve in cross section) extending in the longitudinal direction on the inner wall surface. A slit 22, which is communicated with the splined bore 20, is formed in the longitudinal direction through the upper surface of the frame 12. One end of a bearing member 24 is secured to one end of the frame 12 (see FIG. 2). A motor 14 is attached to the other end of the bearing member 24 together with a bracket 26. Alternatively, the motor 14 may be provided in the frame 12, for example, by the aid of another connecting member (not shown).

Figure 3:
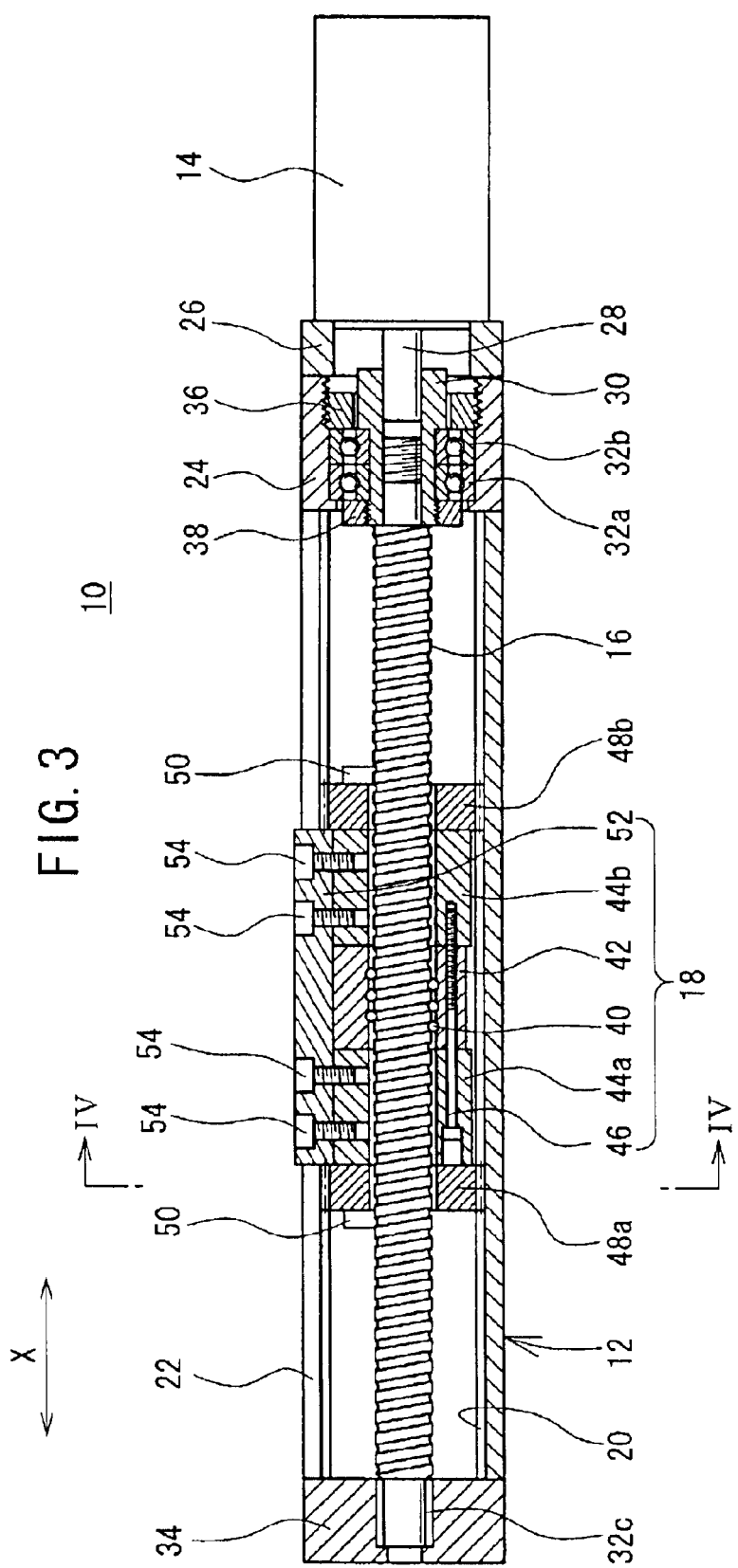
FIG. 3 is a sectional view taken along a line III—III showing the electric actuator shown in FIG. 1.
Figure 4:
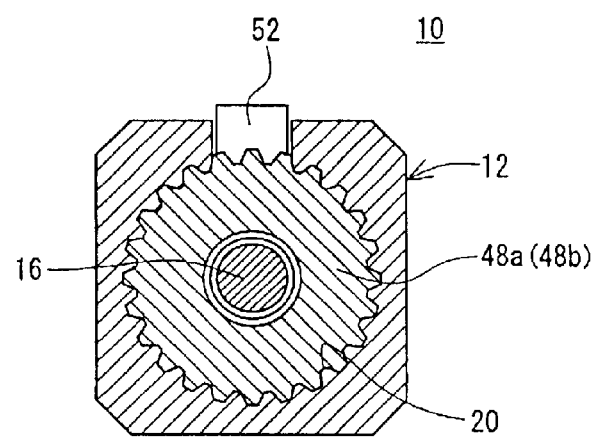
FIG. 4 is a sectional view taken along a line IV—IV showing the electric actuator shown in FIG. 3.

As shown in FIG. 3, the ball screw shaft 16 is connected via a coupling 30 to a rotary shaft 28 of the motor 14. The coupling 30 is rotatably supported by bearings 32a, 32b which are installed to the bearing member 24. Inner wheels of the bearings 32a, 32b are secured to the coupling 30 by the aid of a nut 38. Reference numeral 36 indicates a bearing nut which is screw-engaged with the bearing member 24. The bearing nut 36 functions to press outer wheels of the bearings 32a, 32b against the bearing member 24.

Both ends of the ball screw shaft 16 are rotatably supported by the coupling 30 and a bearing 32c which is installed to a bearing member 34 attached to the other end of the frame 12 (see FIG. 3). In this arrangement, the ball screw shaft 16 penetrates through the interior of the displacement mechanism 18. The feed screw shaft is not limited to the ball screw shaft 16, which may be an unillustrated slide screw shaft.

The displacement mechanism 18 includes a ball spline nut 42 which is screw-engaged with the ball screw shaft 16 by the aid of a ball bearing 40, a pair of displacement members 44a, 44b which make abutment at both ends of the ball spline nut 42, and an attachment section 52 which is attached to upper portions of the pair of displacement members 44a, 44b.

First ends of the displacement members 44a, 44b formed to have substantially cylindrical shapes abut against the both ends of the ball spline nut 42. The displacement members 44a, 44b are connected by an attachment bolt 46 together with the ball spline nut 42 which is disposed between the displacement members 44a, 44b. Gaps are provided between the ball screw shaft 16 and inner walls of the displacement members 44a, 44b so that they are separated from each other by predetermined spacing distances. A pair of spline pistons (spline guide mechanism) 48a, 48b are attached to second ends of the displacement members 48a, 44b by the aid of attachment bolts 50 so that the pair of spline pistons 48a, 48b are prevented from rotation in the circumferential direction. Inner walls of the pair of spline pistons 48a, 48b are separated from the ball screw shaft 16 by predetermined spacing distances. Involute splines, which are slidably meshed with the splined bore 20, are provided on the outer circumferential surfaces of the pair of spline pistons 48a, 48b respectively.

In this arrangement, the spline piston 48a is formed by extrusion with aluminum alloy A6063. In order to establish the gap T (see FIG. 10) with respect to the splined bore 20, (1) an extrusion mold for the spline piston 48a is manufactured, (2) an extruded product of the spline piston 48a is formed by using the extrusion mold, (3) the gap T between the sliding surfaces, with which the spline piston 48a and the splined bore 20 are meshed with each other, is measured for the extruded product, and (4) the extrusion mold is revised so that the measured gap T is coincident with a preset value.

In this embodiment, for example, when the spline piston 48a was formed of a material of POM (polyoxymethylene), PI (polyimide), or UHMW-PE (ultra-high molecular weight polyethylene), a good result was obtained.

More preferably, when the surface roughness of the spline teeth of the spline piston 48a is not more than 1.6 of $R_z$ (ten-point average roughness) taking the surface pressure, the kinematic viscosity, and the speed into consideration on the basis of the elastic fluid lubrication theory, it is possible to decrease the sliding resistance on the sliding surfaces on which the spline piston 48a and the splined bore 20 are meshed with each other.

In this case, in order to perform the machining so that the surface roughness is not more than 1.6 of $R_z$ (ten-point average roughness), a surface treatment such as the Alumite treatment and the electroless nickel plating may be performed after applying, for example, the chemical polishing and the shot blast.

Figure 10:
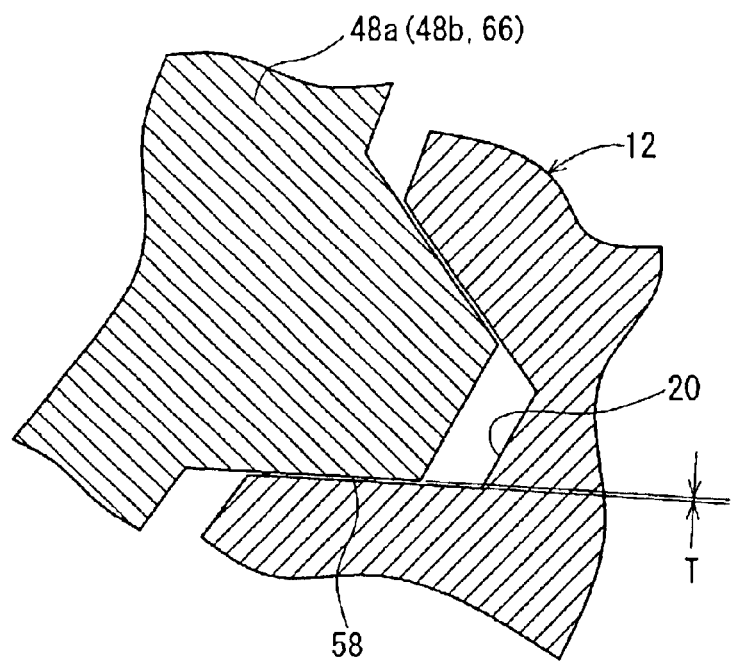
FIG. 10 is a magnified view showing sliding surfaces on which a splined bore and a spline piston shown in FIGS. 4 and 9 are meshed with each other.
Figure 11:
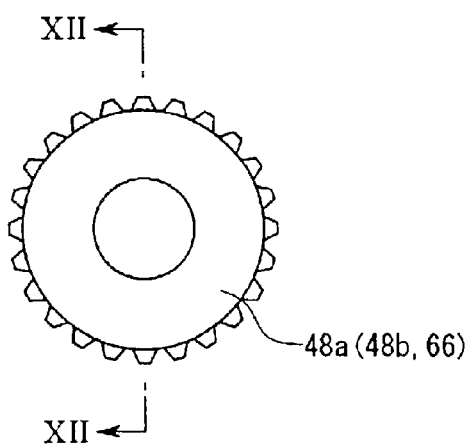
FIG. 11 is a front view showing the spline piston shown in FIGS. 2 and 7.
Figure 12:
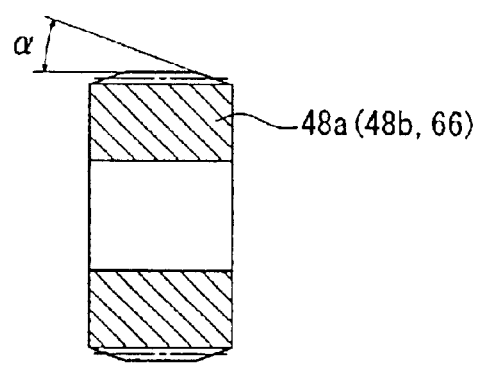
FIG. 12 is a sectional view taken along a line XII—XII showing the spline piston shown in FIG. 11.

Further, as shown in FIGS. 11 and 12, when the chamfering angle α of the end of the spline piston 48a is about 15° to 20°, then a lubricant, for example, a high-viscosity grease is easily charged to the sliding surfaces 58 (see FIG. 10) between the splined bore 20 and the spline piston 48a, thickness of the oil film is sufficient, and the sliding resistance is successfully decreased.

Each of the spline pistons 48b, 66 is also formed by extrusion with aluminum alloy in the same manner as the spline piston 48a. The gap T between the sliding surfaces, with which the spline pistons 48b, 66 and the splined bore 20 are meshed with each other, can be set to be about 0.03 mm by repeating the molding steps of (1) to (4) described above.

The attachment section 52, which extends in the longitudinal direction of the frame 12, is secured by attachment bolts 54 on the displacement members 44a, 44b. The attachment section 52 is provided so that the attachment section 52 is exposed to the outside through the slit 22 which is defined through the upper portion of the frame 12. For example, an unillustrated table is installed to the attachment section 52.

Accordingly, when the ball spline nut 42 is moved in the displacement direction together with the displacement members 44a, 44b and the attachment section 52 by the aid of the ball bearing 40 in accordance with the rotation of the ball screw shaft 16, the spline pistons 48a, 48b are moved in the longitudinal direction along the guide groove of the splined bore 20. In this arrangement, as shown in FIG. 10, a lubricant, for example, a high-viscosity grease having a predetermined base oil kinematic viscosity is used for the sliding surfaces 58 on which the splined bore 20 and the spline pistons 48a, 48b are meshed with each other. Accordingly, the sliding movement is performed smoothly, and it is possible to decrease the sliding resistance. As for the predetermined base oil kinematic viscosity, according to the elastic fluid lubrication theory, it is preferable to use a high-viscosity grease having a kinematic viscosity within a range of 1000 to 10000 centistokes (cSt). For example, when an experiment was performed by using a high-viscosity grease having a base oil kinematic viscosity of 2200 cSt or 9850 cSt, a good result was obtained in each case.

In this embodiment, the high-viscosity grease is used as the lubricant for the following reasons.

(1) The oil film can be made thick because the viscosity is high.

(2) The production cost can be lowered, and the sliding resistance can be decreased even when the surface roughness is unsatisfactory, because it is unnecessary to finish the sliding surfaces of the splined bore 20 and the spline pistons 48a, 48b to have a relatively fine surface roughness.

(3) The use of the high-viscosity grease enhances the resistance to the pollution brought about by any harmful substance contained in the operation fluid.

(4) The oil hardly outflows, and the service lives of the splined bore 20 and the spline pistons 48a, 48b are prolonged.

(5) The metal contact disappears between the splined bore 20 and the spline pistons 48a, 48b, and the vibration is absorbed by the elasticity of the high-viscosity grease. Therefore, it is possible to avoid any generation of noise which would be otherwise generated by the spline pistons 48a, 48b sliding along the guide groove of the splined bore 20, and it is possible to further lower the sliding sound caused by the spline pistons 48a, 48b.

(6) The contact surface is small for the groove at which the splined bore 20 and the spline pistons 48a, 48b are meshed with each other. Thickness of the oil film is sufficient even when the surface pressure (extreme pressure) applied to the high-viscosity grease is high.

The spline, which is formed for the splined bore 20 and the spline pistons 48a, 48b, is not limited to the involute spline. The cross section of the spline tooth may be formed to be a substantially rectangular square.

The electric actuator 10 according to the embodiment of the present invention is basically constructed as described above. Next, its operation, function, and effect will be explained.

When the rotary shaft 28 is rotated by driving the motor 14, the ball screw shaft 16 is rotated by the aid of the coupling 30. The rotary motion of the ball screw shaft 16 is transmitted to the ball spline nut 42 by the aid of the ball bearing 40.

In this arrangement, the pair of spline pistons 48a, 48b are meshed with the splined bore 20. Accordingly, the ball spline nut 42 is prevented from rotation. Therefore, the rotary motion of the ball screw shaft 16 is converted by the ball spline nut 42 into the rectilinear motion. The rectilinear motion is transmitted to the attachment section 52 by the aid of the pair of displacement members 44a, 44b. The attachment section 52 is displaced in the direction of the arrow X shown in FIG. 3 along the guide grooves of the splined bore 20 and the pair of spline pistons 48a, 48b. The unillustrated table or the like, which is placed on the attachment section 52, is transported.

In this process, the load of the workpiece or the like placed on the unillustrated table is applied to the pair of spline pistons 48a, 48b connected to the displacement members 44a, 44b. The load of the workpiece or the like is supported by the splined bore 20 and the spline pistons 48a, 48b.

Figure 5:
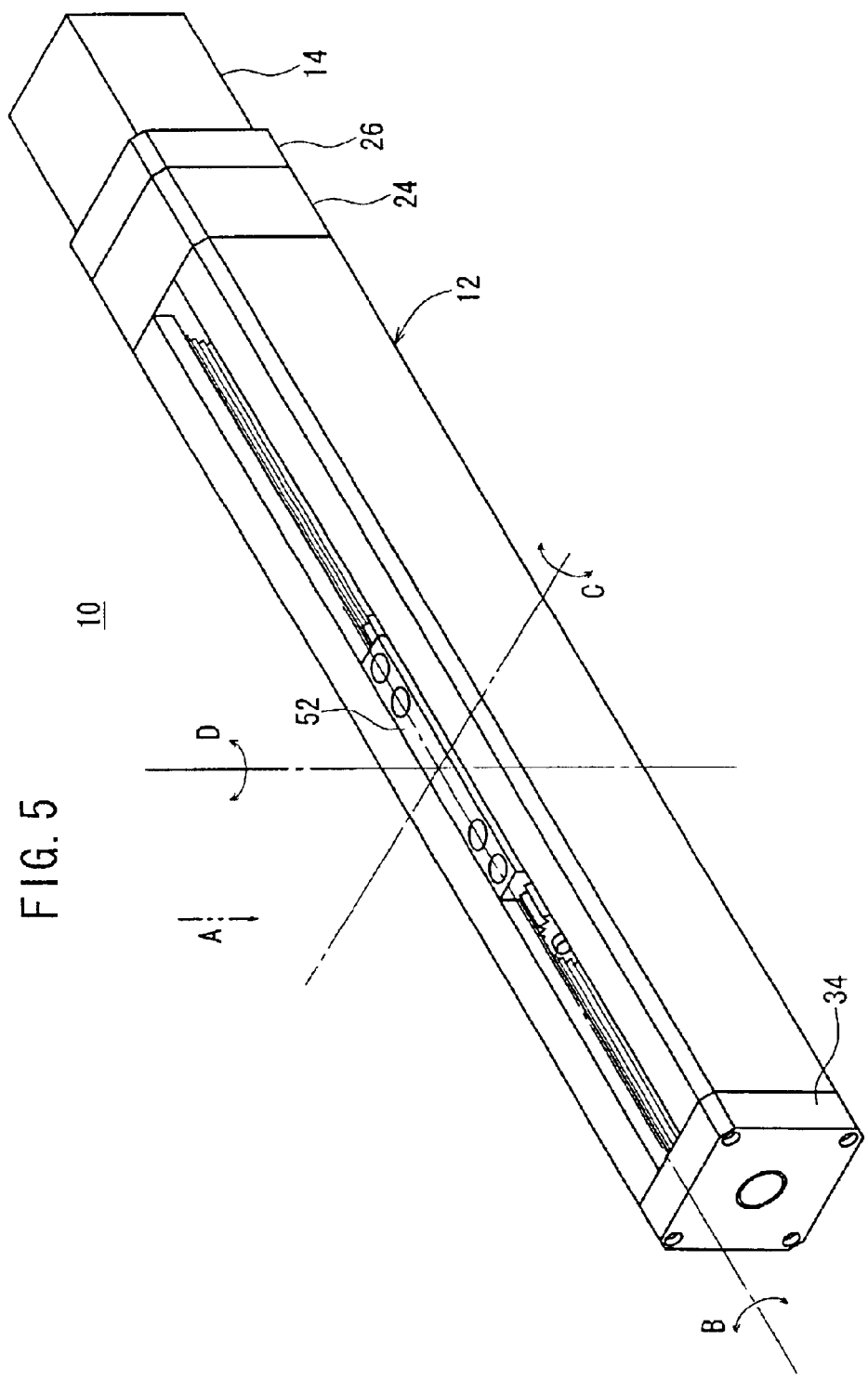
FIG. 5 is a perspective view showing directions of loads applied to an attachment section of the electric actuator according to the embodiment of the present invention.
Figure 6:
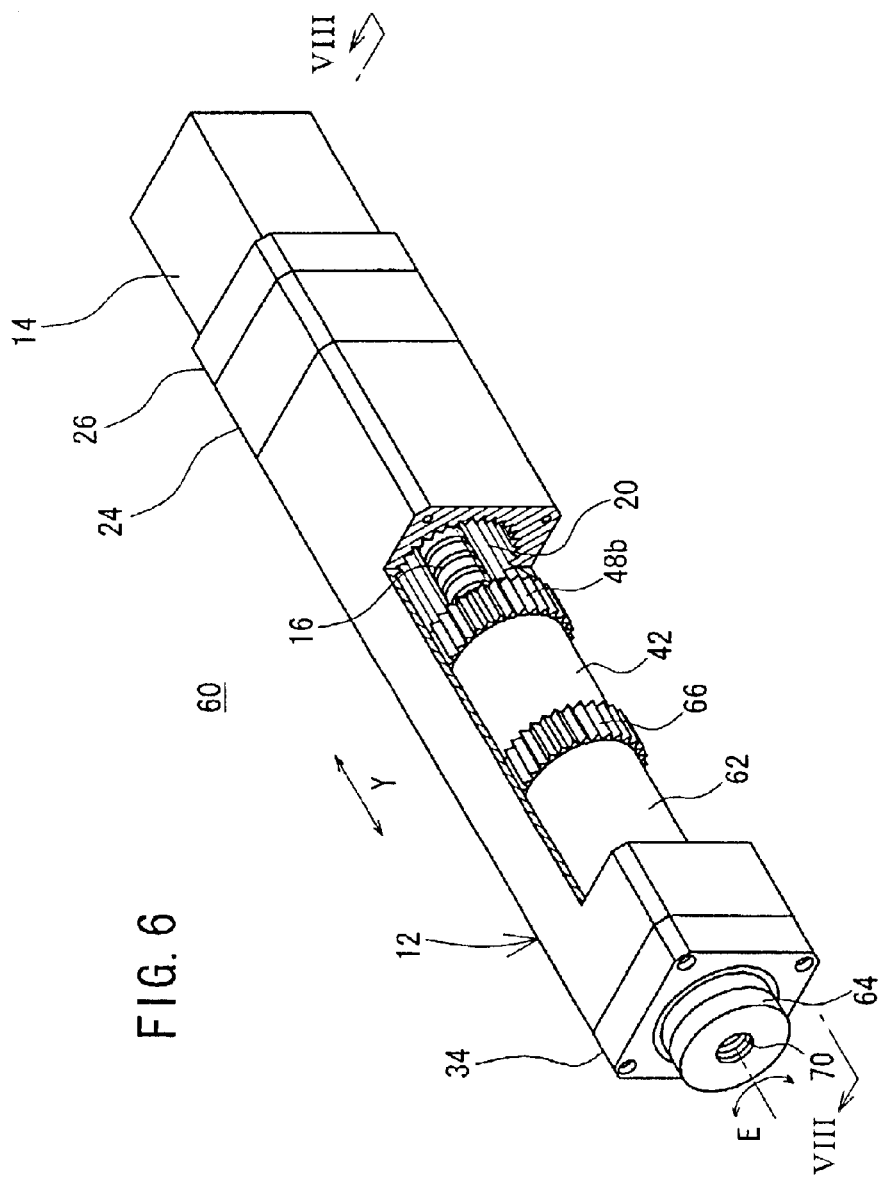
FIG. 6 is a perspective view partially in cross section showing an electric actuator according to a modified embodiment of the present invention.
Figure 7:
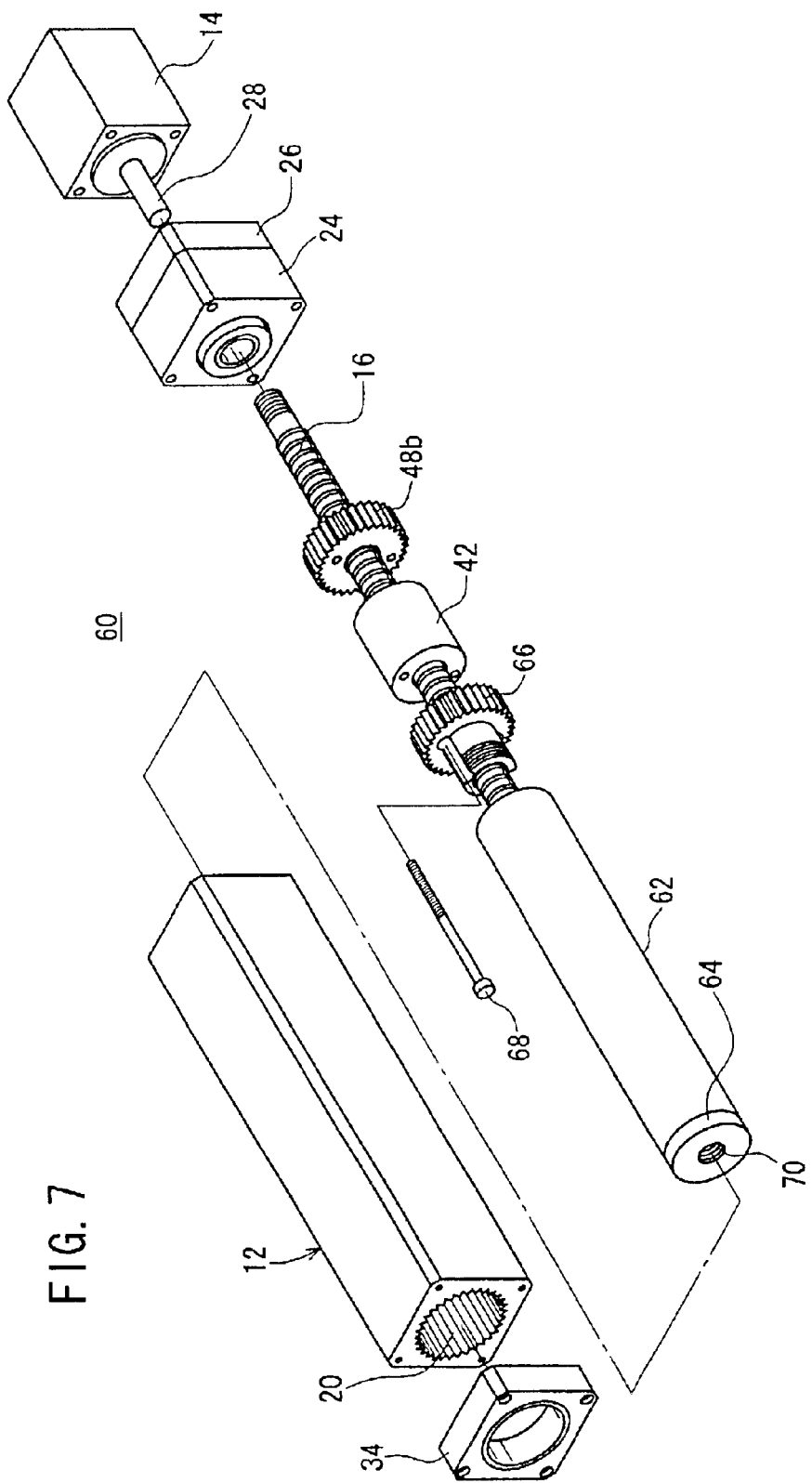
FIG. 7 is a schematic exploded perspective view showing the electric actuator shown in FIG. 6.

Therefore, as shown in FIG. 5, the load applied to the attachment section 52 in the substantially vertical direction (see the arrow A) of the attachment section 52, and the load applied in the circumferential direction (see the arrow B) about the center of the axis of the ball screw shaft 16 are absorbed by the splined bore 20 and the pair of spline pistons 48a, 48b. Further, the load applied in the circumferential direction (see the arrow C) about the center of the horizontal line substantially perpendicular to the axis of the ball screw shaft 16, and the load applied in the circumferential direction (see the arrow D) about the center of the vertical line substantially perpendicular to the axis of the ball screw shaft 16 can be also absorbed by the splined bore 20 and the spline pistons 48a, 48b.

Even when the load is applied to the attachment section 52 (axis of the ball screw shaft 16) in a compositively combined direction, the load can be appropriately absorbed as well.

As described above, the splined bore 20 and the pair of spline pistons 48a, 48b, which are provided for the electric actuator 10 according to the embodiment of the present invention, absorb the load applied to the attachment section 52 in a variety of directions including the substantially vertical direction (see the arrow A) of the attachment section 52, the circumferential direction (see the arrow B) about the center of the axis of the ball screw shaft, the circumferential direction (see the arrow C) about the center of the horizontal line substantially perpendicular to the axis of the ball screw shaft 16, the circumferential direction (see the arrow D) about the center of the vertical line substantially perpendicular to the axis of the ball screw shaft 16, and the direction obtained by compositively combining these directions.

Accordingly, even when the weight of the table or the like applied to the attachment section 52 is increased, the weight is supported by the splined bore 20 and the pair of spline pistons 48a, 48b. Therefore, the weight is not applied to the ball screw shaft 16 via the ball spline nut 42, and thus the ball screw shaft 16 is not flexibly bent.

Next, an electric actuator 60 according to a modified embodiment of the present invention will be explained with reference to FIGS. 6 to 9. The same constitutive components as the constitutive components shown in FIGS. 1 to 5 described above are designated by the same reference numerals, detailed explanation of which will be omitted.

Reference numeral 62 indicates a guide member which is inserted into the splined bore 20. A flange 64 is screw-engaged with one end of the guide member 62 by the aid of a screw, and it is rotatably supported by the bearing 32c installed to the bearing member 34. The other end of the guide member 62 is installed to a spline piston 66 by the aid of a screw mechanism. In this embodiment, spline pistons 48b, 66 are integrally connected to the both ends of the ball spline nut 42 by the aid of an attachment bolt 68. A screw hole 70 for engaging another unillustrated member is formed in the flange 64.

Figure 8:
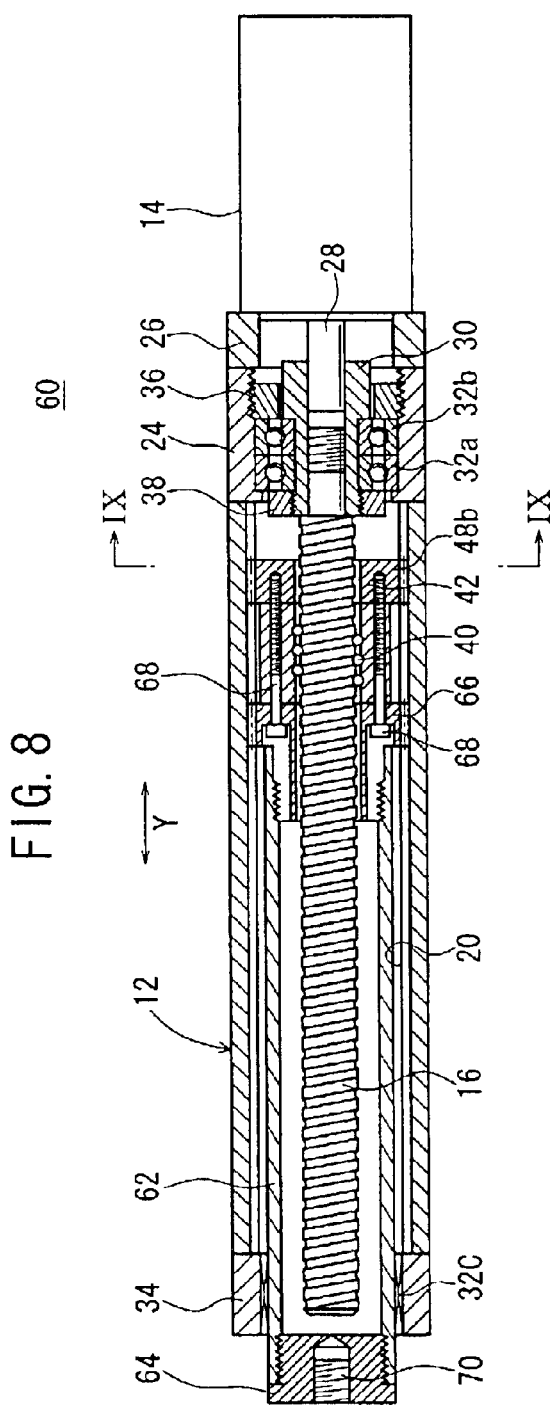
FIG. 8 is a sectional view taken along a line VIII—VIII showing the electric actuator shown in FIG. 6.
Figure 9:
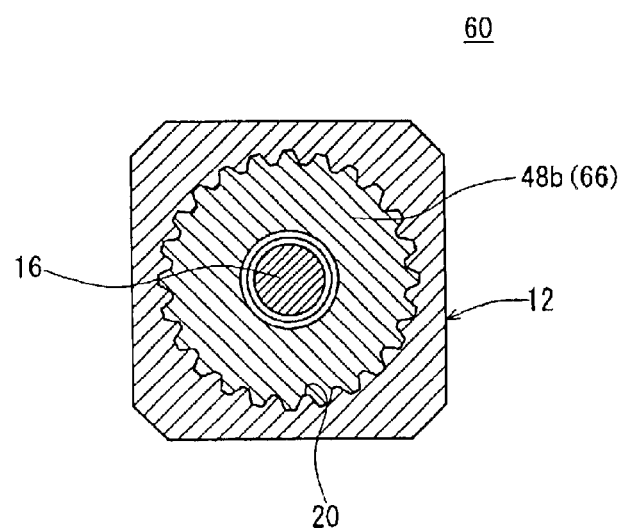
FIG. 9 is a sectional view taken along a line IX—IX showing the electric actuator shown in FIG. 8.

In the electric actuator 60 according to the modified embodiment, when the ball screw shaft 16 is rotated by driving the motor 14, the ball spline nut 42 is displaced in the direction of the arrow Y shown in FIG. 8 by the aid of the spline pistons 48b, 66. Accordingly, the guide member 62 comes in and goes out from the splined bore 20 as the guide groove in the displacement direction. The unillustrated member is transported in the direction of the arrow Y. In this embodiment, as shown in FIGS. 9 and 10, when a lubricant, for example, a high-viscosity grease is applied to the sliding surfaces 58 on which the splined bore 20 and the spline pistons 48b, 66 are meshed with each other, the optimum state is maintained with the sufficient surface pressure, the kinematic viscosity, and the speed in accordance with the elastic lubrication theory. Therefore, the sliding movement is effected smoothly, and the metal contact is consequently decreased. Thus, it is possible to decrease the sliding resistance.

Therefore, the guide member 62 can absorb the load applied to the guide member 62 in the circumferential direction (see the arrow E) about the center of the axis of the guide member 62 by the aid of the splined bore 20 and the spline pistons 48b, 66.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. An electric actuator comprising:

a frame;

a rotary driving source which is disposed inside or outside said frame;

a feed screw shaft which is connected to a drive shaft of said rotary driving source for receiving rotary driving force from said rotary driving source;

a displacement mechanism which is engaged with said feed screw shaft, which converts rotary motion of said feed screw shaft into rectilinear motion, and which is displaceable in an axial direction of said feed screw shaft; and a spline guide mechanism which is connected to said displacement mechanism, which guides said displacement mechanism in said axial direction of said feed screw shaft, an which absorbs loads applied to said displacement mechanism in a substantially vertical direction, in a circumferential direction about a center of an axis of said feed screw shaft, in a circumferential direction about a center of a horizontal line substantially perpendicular to said axis of said feed screw shaft, in a circumferential direction about a center of a vertical line substantially perpendicular to said axis of said feed screw shaft, and in a direction obtained by compositively combining said directions, wherein said spline guide mechanism includes a splined bore which has a plurality of adjacent splines provided in a longitudinal direction formed over an entire inner wall circumferential surface of said frame, and a pair of spline pistons each of which has a plurality of adjacent spline teeth, formed over an entire outer circumferential surface, to be fitted to said splined bore.

2. The electric actuator according to claim 1, wherein said displacement mechanism includes a ball spline nut which is screw-engaged with a ball screw shaft by the aid of a ball bearing, a pair of displacement members which abut against both ends of said ball spline nut and which are connected to said ball spline nut, and an attachment section which is attached to said pair of displacement members.

3. The electric actuator according to claim 2, wherein said pair of spline pistons are provided while being separated from each other by a predetermined spacing distance at ends of said pair of displacement members in a displacement direction, and said pair of spline pistons are meshed with said splined bore which is formed on an inner wall surface of said frame.

4. The electric actuator according to claim 1, wherein said splined bore has involute spline.

5. The electric actuator according to claim 1, wherein said pair of spline pistons have involute splines.

6. The electric actuator according to claim 1, wherein said displacement mechanism includes a ball spline nut which is screw-engaged with a ball screw shaft by the aid of a ball bearing and which is connected between said pair of spline pistons, and a cylindrical guide member which is connected to one spline piston and which is movable back and forth with respect to an end of said frame by making displacement along said splined bore formed in said frame.

7. The electric actuator according to claim 1, wherein a gap exists between sliding surfaces of said spline teeth and said splines, when the spline teeth of said pair of spline pistons are meshed with the splines of said splined bore.

8. The electric actuator according to claim 7, wherein said gap is about 0.003mm.

9. The electric actuator according to claim 7, wherein a high-viscosity grease is charged to said sliding surfaces, between said splined bore and said spline pistons, said high-viscosity grease having a kinematic viscosity within a range of 1000 to 10000 cSt.

10. The electric actuator according to claim 9, wherein said high-viscosity grease has a kinematic viscosity of 2200 cst or 9850 cSt.

11. The electric actuator according to claim 1, wherein said spline pistons are formed of one of polyoxymethylene, polyimide, and ultra-high molecular weight polyethylene.

12. The electric actuator according to claim 1, wherein a chamfering angle of 15° 20° is formed on respective ends of the spline teeth of said spline pistons.

13. The electric actuator according to claim 1, wherein said frame has a longitudinal slot, further comprising an attachment section attached to said displacement mechanism and protruding into said longitudinal slot, said attachment section being displaceable in said slot in unison with said displacement mechanism.

* * * * *